(12) United States Patent
Karanath et al.

(10) Patent No.: US 12,248,583 B2
(45) Date of Patent: Mar. 11, 2025

(54) SYSTEMS AND METHODS FOR ENCRYPTING DIALOGUE BASED DATA IN A DATA STORAGE SYSTEM

(71) Applicant: BANK OF AMERICA CORPORATION, Charlotte, NC (US)

(72) Inventors: Dalydas Karanath, Kerala (IN); Syed Najumudeen, Telangana (IN); Radhika Vinaikrishnan Nair, Maharashtra (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 295 days.

(21) Appl. No.: 17/888,037

(22) Filed: Aug. 15, 2022

(65) Prior Publication Data
US 2024/0054235 A1    Feb. 15, 2024

(51) Int. Cl.
| G06F 21/60 | (2013.01) |
| G06F 16/68 | (2019.01) |
| G06F 21/62 | (2013.01) |
| G10L 17/02 | (2013.01) |

(52) U.S. Cl.
CPC ............ *G06F 21/60* (2013.01); *G06F 16/686* (2019.01); *G06F 21/6218* (2013.01); *G10L 17/02* (2013.01)

(58) Field of Classification Search
None
See application file for complete search history.

(56) References Cited

U.S. PATENT DOCUMENTS

| | | | |
|---|---|---|---|
| 6,064,738 A * | 5/2000 | Fridrich | H04L 9/001 380/243 |
| 7,330,563 B2 | 2/2008 | Rhoads | |
| 7,466,840 B2 | 12/2008 | Rhoads | |
| 7,486,799 B2 | 2/2009 | Rhoads | |
| 7,676,059 B2 | 3/2010 | Rhoads | |
| 7,769,174 B2 | 8/2010 | Cho et al. | |
| 7,805,377 B2 | 9/2010 | Felsher | |
| 7,970,167 B2 | 6/2011 | Rhoads | |
| 7,986,773 B2 | 7/2011 | Kalahasti et al. | |
| 7,987,245 B2 | 7/2011 | Rhoads | |
| 8,023,695 B2 | 9/2011 | Rhoads | |
| 8,078,697 B2 | 12/2011 | Rhoads | |
| 8,204,222 B2 | 6/2012 | Rhoads | |
| 8,265,278 B2 | 9/2012 | Moskowitz et al. | |
| 8,316,237 B1 | 11/2012 | Felsher et al. | |
| 8,401,155 B1 | 3/2013 | Barnes et al. | |
| 8,411,898 B2 | 4/2013 | Rhoads | |
| 8,831,204 B1 | 9/2014 | Pycko et al. | |
| 8,972,736 B2 | 3/2015 | Peirce et al. | |

(Continued)

Primary Examiner — Kaveh Abrishamkar
(74) Attorney, Agent, or Firm — Moore & Van Allen PLLC; Nicholas C. Russell

(57) ABSTRACT

Embodiments of the invention are directed to systems, methods, and computer program products that provide a unique platform for analyzing, classifying, extracting, and dialogue information from audio file recordings between a customer and an agent of an entity. In particular, the novel present invention provides a unique platform for analyzing, classifying, extracting, and processing information from call recordings using an image-based encryption method and cognitive neural engine in order to segment audio files according to speaker, and later analyze recording information to generate contextual inferences regarding user preferences and agent performance.

17 Claims, 6 Drawing Sheets

(56) References Cited

U.S. PATENT DOCUMENTS

| | | |
|---|---|---|
| 9,596,344 B2 | 3/2017 | Lum et al. |
| 9,787,835 B1 | 10/2017 | Pycko et al. |
| 11,295,029 B1 * | 4/2022 | Greenblatt .......... H04N 1/32144 |
| 11,893,464 B1 * | 2/2024 | Everest ................... G06F 21/31 |
| 2003/0115451 A1 | 6/2003 | Walker et al. |
| 2004/0111399 A1 * | 6/2004 | Rice ...................... G06F 21/552 |
| 2005/0114234 A1 * | 5/2005 | Thomas ............... G06Q 10/087 |
| | | 705/28 |
| 2009/0185673 A1 | 7/2009 | Erhart et al. |
| 2011/0222688 A1 | 9/2011 | Graham et al. |
| 2015/0058017 A1 * | 2/2015 | Singh .................. G06F 21/6218 |
| | | 704/249 |
| 2015/0099469 A1 * | 4/2015 | Goldstein ......... H04M 1/72412 |
| | | 455/41.2 |
| 2017/0221488 A1 * | 8/2017 | Xiong .................... G10L 17/02 |
| 2017/0310820 A1 * | 10/2017 | Kao ....................... G10L 25/90 |
| 2023/0274377 A1 * | 8/2023 | Kulshrestha ........... G06N 3/045 |
| | | 705/326 |
| 2023/0386642 A1 * | 11/2023 | Foufa ...................... G10L 25/63 |
| 2024/0135949 A1 * | 4/2024 | Eskimez ................. G10L 17/06 |

* cited by examiner

SYSTEMS AND METHODS FOR ENCRYPTING DIALOGUE BASED DATA IN A DATA STORAGE SYSTEM

FIELD OF THE INVENTION

The present invention generally relates to the field of automated, secure, and flexible information storage and insight extraction with regard to recorded audio data.

BACKGROUND

Current tools for call audio recording present an opportunity for improvement in terms of secure storage, intelligent user-based voice recognition/segmentation, and post-recording analysis. There is a need for an enhanced system with a multifaceted capability to intelligently segment call recordings based on identified speakers, manage segmented call recordings in a uniform and accessible fashion, and do so in a way that prevents any unauthorized access to such recording information. An ideal system would also possess the capability to store such information in a fully encrypted manner which is not readily apparent as containing audio information, such that unauthorized users cannot locate or categorize relevant call audio data files, further adding to the security of the system overall. Seeing as recording analysis using manual human review is a time intensive process, an ideal system would also possess the ability to fully automate the process of call audio recording categorization, segmentation, and encryption. By automating the process, the proposed system would be less time consuming, less prone to human error, and less susceptible to unauthorized access or bypass of security measures via a potentially compromised user account.

The above discussion of the background to the invention is provided for illustrative purposes only and is not an acknowledgement or admission that any of the material referred to is or was part of the common general knowledge as at the priority date of the application.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention comprise systems, methods, and computer program products that address the above and/or other needs by providing an innovative system, method and computer program product for intelligently analyzing, categorizing, and encrypting dialogue based data in an automated data storage system. Typically the system comprises: at least one memory device with computer-readable program code stored thereon; at least one communication device; at least one processing device operatively coupled to the at least one memory device and the at least one communication device, wherein executing the computer-readable code is configured to cause the at least one processing device to: record an audio file of a call between one or more users; generate a wave transform of the audio file; analyze the wave transform of the audio file to identify segments of the audio file which represent the voice of each of the one or more users; store timestamps corresponding to each of the identified segments of the audio file; and encrypt each of the identified segments of the audio file using a steganographic application of an image file.

In some embodiments, the invention is further configured to: convert an encrypted audio file back to an original audio file; and apply a cognitive processing engine to extract one or more contextual inferences from the original audio file.

In some embodiments, the invention is further configured to receive a request for decryption of the identified segments of the audio file; respond to the request for decryption with a request for one or more authentication credentials; receive the one or more authentication credentials; determine if the one or more authentication credentials are valid; and based on the authentication credentials provided, respond to the request for decryption with an automated decryption and delivery of a limited number of the identified segments of the audio file.

In some embodiments, the steganographic application of an image file further comprises using a steganographic chaos encryption function.

In some embodiments, the image file is randomly or pseudo randomly chosen for each of the identified segments of the audio file.

In some embodiments, each of the identified segments of the audio file is linked using hashing key and timestamp based a time sequence.

In some embodiments, the one or more contextual inferences further comprise client preferences or conversational anomalies during the course of a customer service interaction.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
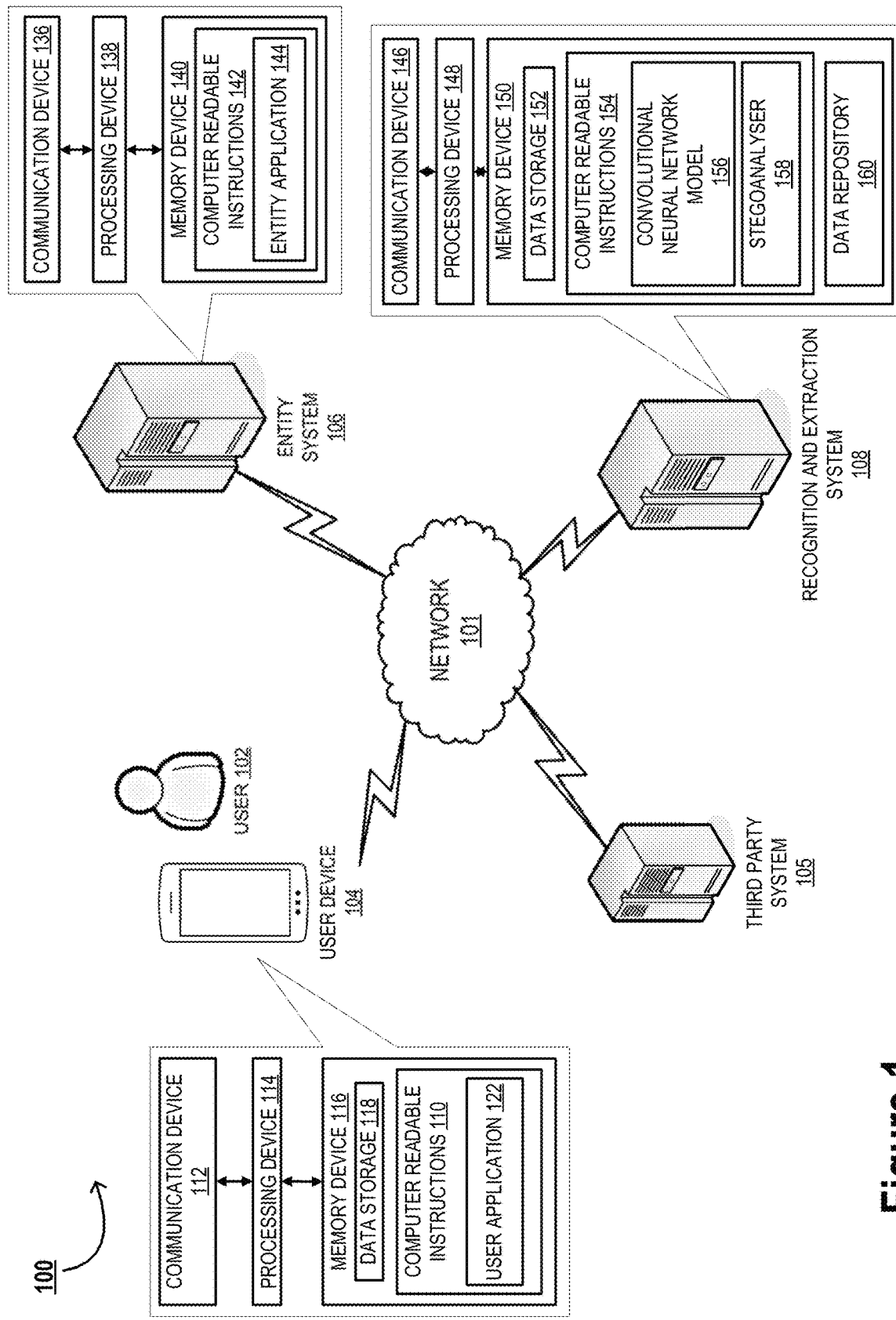
Figure 2A:
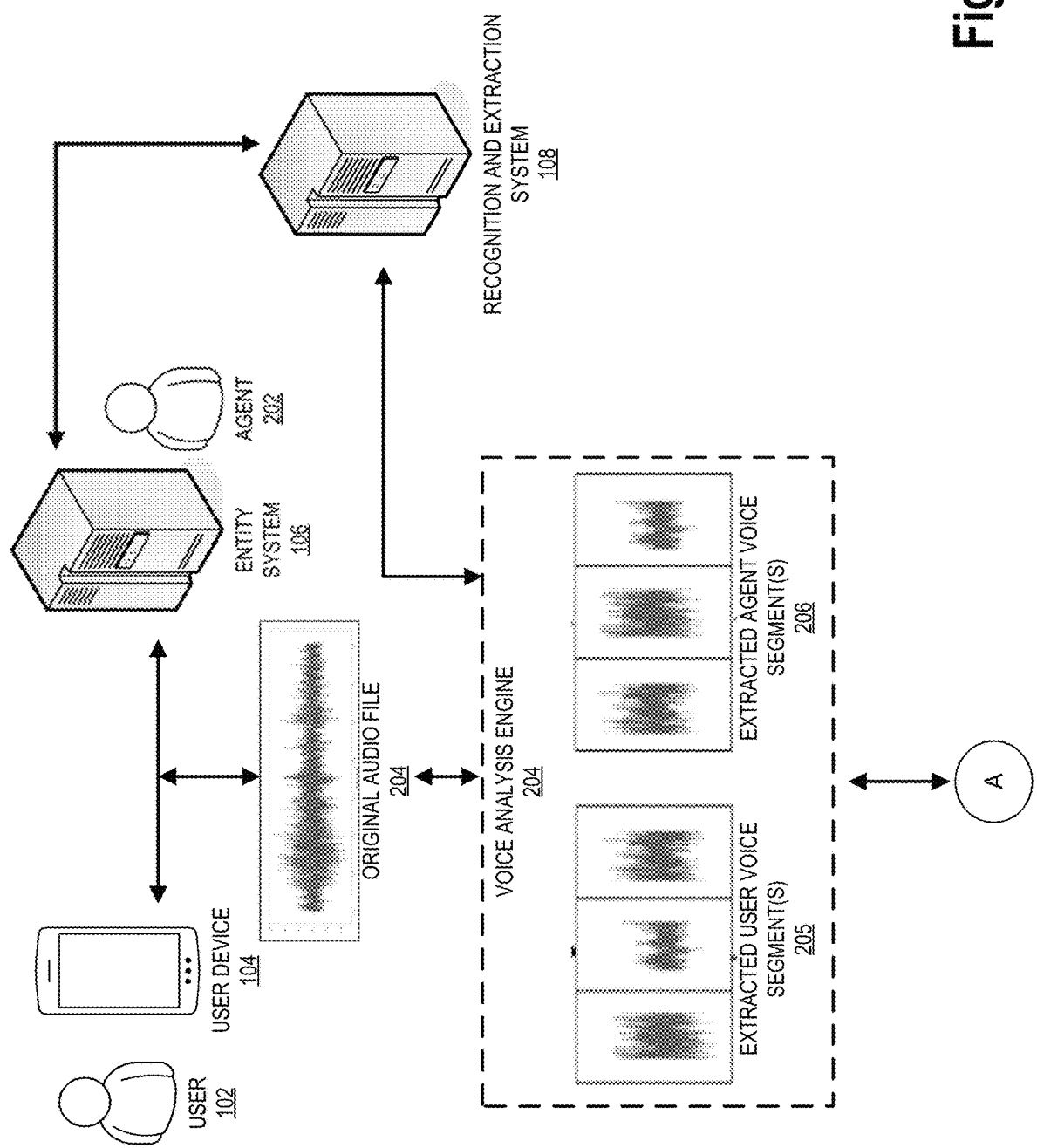
Figure 2B:
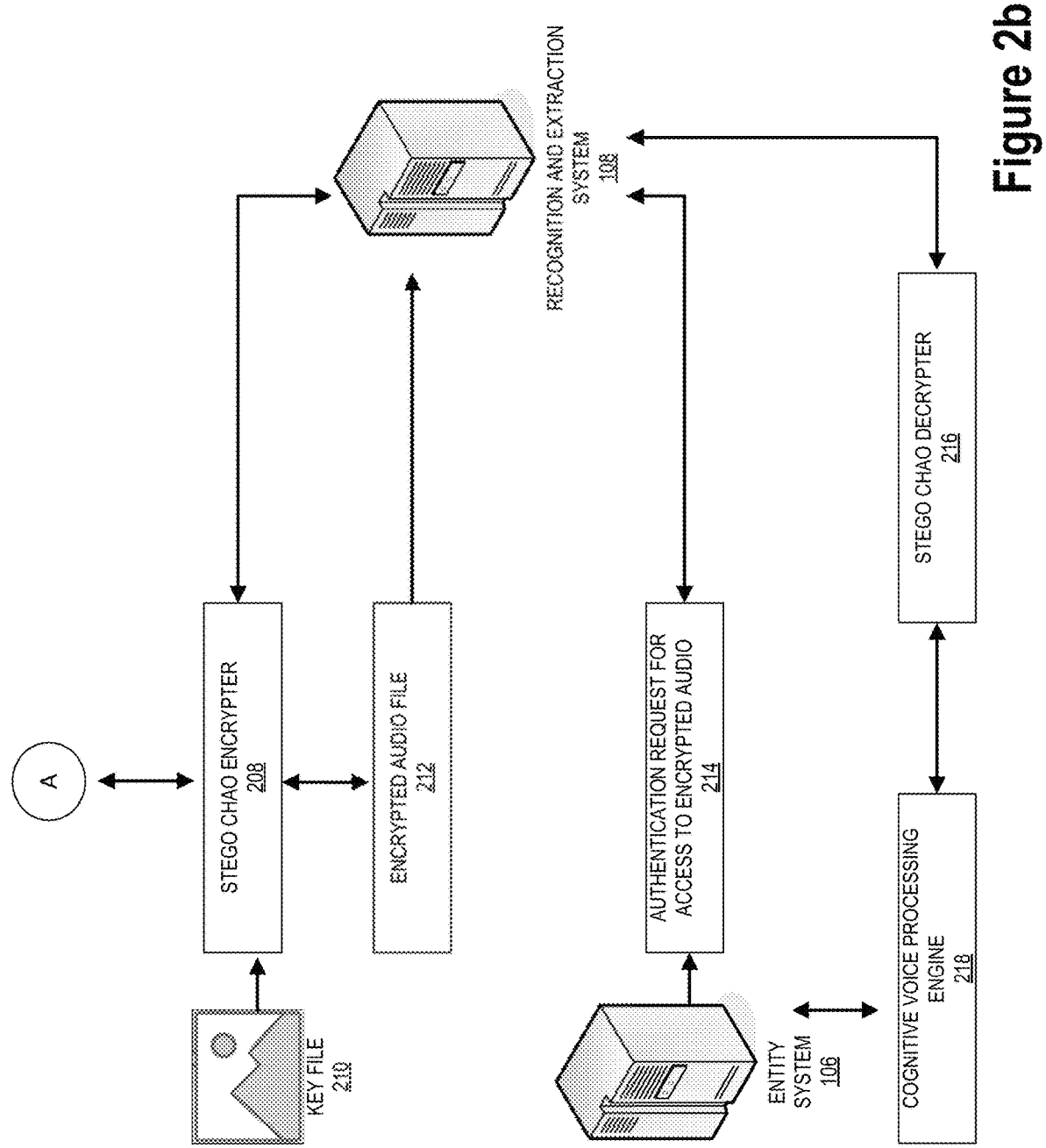
Figure 3:
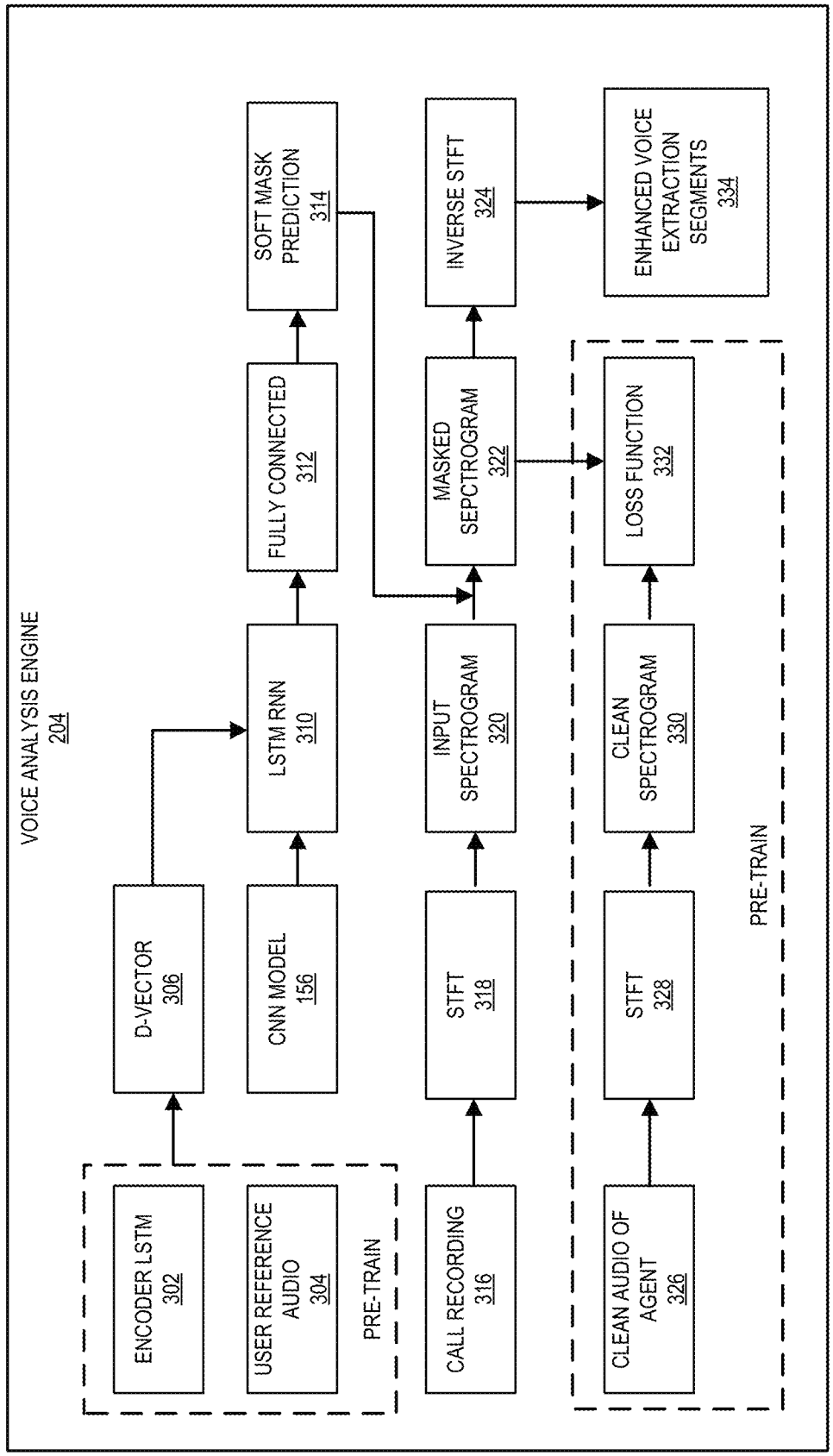
Figure 4:
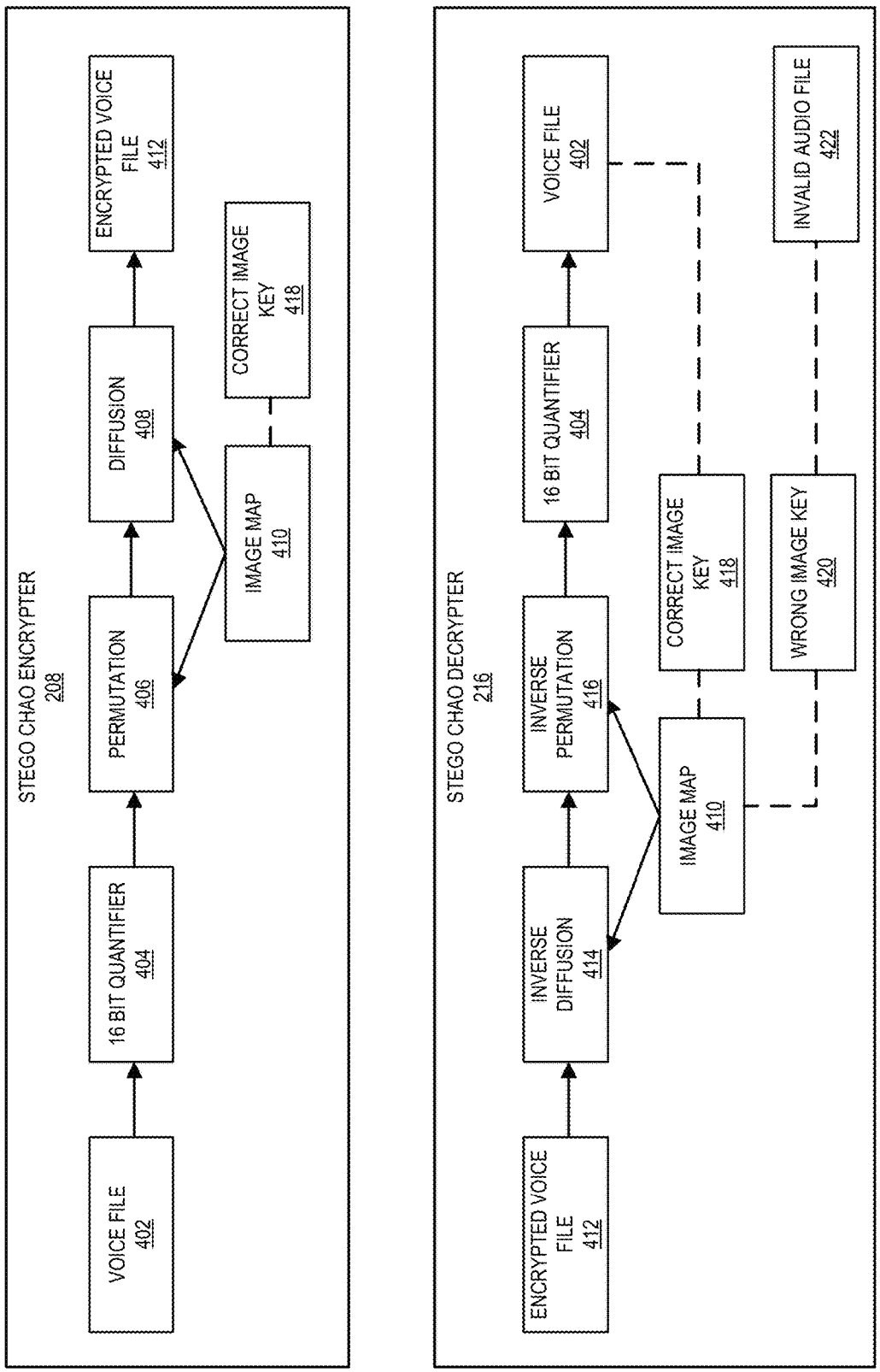
Figure 5:
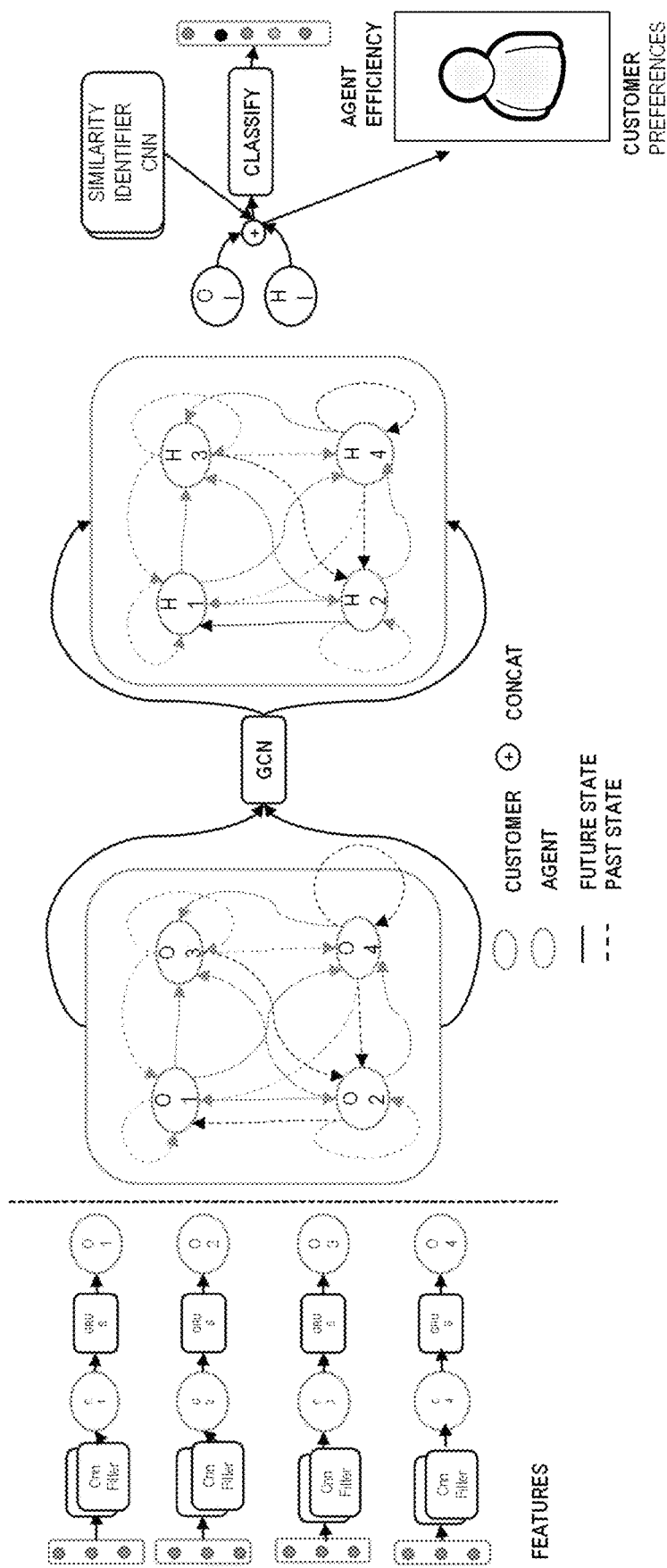

Having thus described embodiments of the invention in general terms, reference will now be made to the accompanying drawings, wherein:

FIG. 1 depicts a system environment, in accordance with one embodiment of the present invention;

FIG. 2a depicts a high level process flow for audio file collection and segmenting, in accordance with one embodiment of the present invention;

FIG. 2b depicts a high level process flow for audio file encryption, decryption, and analysis, in accordance with one embodiment of the present invention;

FIG. 3 depicts a process flow diagram voice analysis engine 204, in accordance with one embodiment of the present invention;

FIG. 4 depicts process flow diagrams of stego chao encrypter 208 and stego chao decrypter 216, in accordance with one embodiment of the present invention;

FIG. 5 depicts a process flow diagram of a cognitive voice processing engine, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

In some embodiments, an "entity" or "enterprise" as used herein may be any institution employing information technology resources and particularly technology infrastructure configured for large scale processing of electronic files, electronic technology event data and records, and performing/processing associated technology activities. In some instances, the entity's technology systems comprise multiple technology applications across multiple distributed technology platforms for large scale processing of technology activity files and electronic records. As such, the entity may be any institution, group, association, financial institution, establishment, company, union, authority or the like, employing information technology resources.

As described herein, a "user" is an individual associated with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer. In other embodiments, a user may be a system performing one or more tasks described herein.

In the instances where the entity is a financial institution, a user may be an individual or entity with one or more relationships affiliations or accounts with the entity (for example, a financial institution). In some embodiments, the user may be an entity or financial institution employee (e.g., an underwriter, a project manager, an IT specialist, a manager, an administrator, an internal operations analyst, bank teller or the like) capable of operating the system described herein. In some embodiments, a user may be any individual or entity who has a relationship with a customer of the entity or financial institution. For purposes of this invention, the term "user" and "customer" may be used interchangeably. A "technology resource" or "account" may be the relationship that the user has with the entity. Examples of technology resources include a deposit account, such as a transactional account (e.g. a banking account), a savings account, an investment account, a money market account, a time deposit, a demand deposit, a pre-paid account, a credit account, or the like. The technology resource is typically associated with and/or maintained by an entity.

As used herein, a "user interface" or "UI" may be an interface for user-machine interaction. In some embodiments the user interface comprises a graphical user interface. Typically, a graphical user interface (GUI) is a type of interface that allows users to interact with electronic devices such as graphical icons and visual indicators such as secondary notation, as opposed to using only text via the command line. That said, the graphical user interfaces are typically configured for audio, visual and/or textual communication. In some embodiments, the graphical user interface may include both graphical elements and text elements. The graphical user interface is configured to be presented on one or more display devices associated with user devices, entity systems, processing systems and the like. In some embodiments the user interface comprises one or more of an adaptive user interface, a graphical user interface, a kinetic user interface, a tangible user interface, and/or the like, in part or in its entirety.

The system described herein provides an automated system for intelligent analysis of call recording audio in order categorize and timestamp call recordings according to multiple different speakers or users. For instance, in a customer service context, a user or customer may contact an entity for assistance regarding some product, service, account, or the like that the entity offers or maintains for the user. In some embodiments, the user or customer may provide confidential or sensitive information over an audio communication channel, such as a phone call or virtual session. Call recordings between the user or customer and the entity may be recorded in some instances to later refer to the information provided by the user in order to improve the user or customer experience with the entity, to train additional employees, or to monitor the level of service provided by current employees of the entity. Conventional system present various issues. For instance, entities often look for solutions regarding how to process archived interactions between customers and customer care agent, and store such data in a secure, immutable fashion. Additionally, entities are often interested in introspecting recorded audio in order to analyze particular customer interactions and enable the entity to infer client preferences and serve them proactively according to their stated or implied preferences. Further, entities can further improve their systems, processes, and policies by identifying customer interactions anomalies during course of interactions and train customer care agents or employees using quantitatively measured efficiency metrics in order to improve customer experiences. The present invention provides solutions to all of these goals by using a cognitive natural language processing unit as a built-in form of intelligence to learn, analyze, and extract particular segments of call recordings in order to understand the customer experience, customer-specific preferences, and score customer care performance to gain a more holistic view of the client relationship. In addition, the system employs the use of a stego chao encrypter and hashing algorithm that applies a combination of images and segmentation of audio recordings to store audio files and prevent access or manipulation of the audio sequence which is a unique solution in this area not currently available to entities as an off-the-shelf solution. By using the stego chao encrypter to dynamically generate image files while encrypting audio files, this image will act as a key to decrypt and encrypt the audio recordings. These images are randomly or pseudo-randomly generated for every such interaction to store interactions securely to prevent any confidential information leaks post call.

FIG. 1 depicts a system environment 100, in accordance with one embodiment of the present invention. As illustrated in FIG. 1, a storage and encryption system 108 is operatively coupled, via a network 101 to a user device 104, to an entity system 106, and to a third party system 105. In this way, the storage and encryption system 108 can send information to and receive information from the user device 104, the entity system 106, and the third party system 105. FIG. 1 illustrates only one example of an embodiment of the system environment 100, and it will be appreciated that in other embodiments one or more of the systems, devices, or servers may be combined into a single system, device, or server, or be made up of multiple systems, devices, or servers. In this way, the recognition and extraction system 108, is configured for receiving audio data for analysis, performing contextual recognition using a deep learning algorithm, encoding audio file attributes into vectorized representational components, and populating a database with encrypted audio data files for later access and decryption.

The network 101 may be a system specific distributive network receiving and distributing specific network feeds and identifying specific network associated triggers. The network 101 may also be a global area network (GAN), such as the Internet, a wide area network (WAN), a local area network (LAN), or any other type of network or combination of networks. The network 101 may provide for wireline, wireless, or a combination wireline and wireless communication between devices on the network 101.

In some embodiments, the user 102 may be one or more individuals or entities that may either provide images for analysis, recognition and extraction, query the storage and encryption system 108 for identified attributes, set parameters and metrics for data analysis, and/or receive/utilize centralized database information created and disseminated by the recognition and extraction system 108. As such, in some embodiments, the user 102 may be associated with the entity and/or a financial institution. In other embodiments, the user 102 may be associated with another system or entity, such as third party system 105, which may be granted access to the storage and encryption system 108 or entity system 106 in some embodiments.

FIG. 1 also illustrates a user system 104. The user device 104 may be, for example, a desktop personal computer, a mobile system, such as a cellular phone, smart phone, personal data assistant (PDA), laptop, or the like. The user device 104 generally comprises a communication device 112, a processing device 114, and a memory device 116. The user device 104 is typically a computing system that is configured to enable user and device authentication for access to technology event data. The processing device 114 is operatively coupled to the communication device 112 and the memory device 116. The processing device 114 uses the communication device 112 to communicate with the network 101 and other devices on the network 101, such as, but not limited to, the entity system 106, the storage and encryption system 108 and the third party system 105. As such, the communication device 112 generally comprises a modem, server, or other device for communicating with other devices on the network 101.

The user device 104 comprises computer-readable instructions 110 and data storage 118 stored in the memory device 116, which in one embodiment includes the computer-readable instructions 110 of a user application 122. In some embodiments, the storage and encryption system 108 and/or the entity system 106 are configured to cause the processing device 114 to execute the computer readable instructions 110, thereby causing the user device 104 to perform one or more functions described herein, for example, via the user application 122 and the associated user interface.

As further illustrated in FIG. 1, the storage and encryption system 108 generally comprises a communication device 146, a processing device 148, and a memory device 150. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device, such as the processing device 148, typically includes functionality to operate one or more software programs, based on computer-readable instructions thereof, which may be stored in a memory device, for example, executing computer readable instructions 154 or computer-readable program code 154 stored in memory device 150 to perform one or more functions associated with the recognition and extraction system 108.

The processing device 148 is operatively coupled to the communication device 146 and the memory device 150. The processing device 148 uses the communication device 146 to communicate with the network 101 and other devices on the network 101, such as, but not limited to the entity system 106, the third party system 105, and the user system 104. As such, the communication device 146 generally comprises a modem, server, or other device for communicating with other devices on the network 101.

As further illustrated in FIG. 1, the storage and encryption system 108 comprises the computer-readable instructions 154 stored in the memory device 150, which in one embodiment includes the computer-readable instructions for the implementation of a convolutional neural network model ("CNN model") 156. In some embodiments, the computer readable instructions 154 comprise executable instructions associated with the CNN model 156, wherein these instructions, when executed, are typically configured to cause the applications or modules to perform/execute one or more steps described herein. In some embodiments, the memory device 150 includes data storage 152 for storing data related to the system environment, but not limited to data created and/or used by the CNN model 156 and its components/modules. The CNN model 156 is further configured to perform or cause other systems and devices to perform the various steps in processing audio recording data and organizing data in a secure, encrypted manner, as will be described in detail later on. A convolutional neural network ("CNN") is a class of deep, feed-forward artificial neural networks, most commonly applied to analyzing visual imagery. Compared to other image classification algorithms, CNNs use relatively little pre-processing, and in some embodiments the CNN uses a recurring parametric network optimization to learn filters that traditionally are hand-engineered. This results in a reduction of human effort which offers a major advantage over conventional applications.

As such, the processing device 148 is configured to perform some or all of the data processing and event capture, transformation and analysis steps described throughout this disclosure, for example, by executing the computer readable instructions 154. In this regard, the processing device 148 may perform one or more steps singularly and/or transmit control instructions that are configured to the CNN model 156, entity system 106, user device 104, and third party system 105 and/or other systems and applications, to perform one or more steps described throughout this disclosure. Although various data processing steps may be described as being performed by the CNN model 156 and/or its components/applications and the like in some instances herein, it is understood that the processing device 148 is configured to establish operative communication channels with and/or between these modules and applications, and transmit control instructions to them, via the established channels, to cause these module and applications to perform these steps.

Embodiments of the storage and encryption system 108 may include multiple systems, servers, computers or the like maintained by one or many entities. FIG. 1 merely illustrates one of those systems 108 that, typically, interacts with many other similar systems to form the information network. In one embodiment of the invention, the storage and encryption system 108 is operated by the entity associated with the entity system 106, while in another embodiment it is operated by a second entity that is a different or separate entity from the entity system 106. In some embodiments, the entity system 106 may be part of the recognition and extraction system 108. Similarly, in some embodiments, the storage and encryption system 108 is part of the entity system 106. In other embodiments, the entity system 106 is distinct from the recognition and extraction system 108.

In one embodiment of the recognition and extraction system 108, the memory device 150 stores, but is not limited to, the CNN model 156 as will be described later on in this disclosure. In one embodiment of the invention, the CNN model 156 may associated with computer-executable program code that instructs the processing device 148 to operate the network communication device 146 to perform certain communication functions involving the third party system 105, the user device 104 and/or the entity system 106, as described herein. In one embodiment, the computer-executable program code of an application associated with the CNN model 156 may also instruct the processing device 148 to perform certain logic, data processing, and data storing functions of the application.

The processing device 148 is configured to use the communication device 146 to receive data, such as images, or metadata associated with images, transmit and/or cause display of extracted data and the like. In the embodiment illustrated in FIG. 1 and described throughout much of this specification, the CNN model 156 may perform one or more of the functions described herein, by the processing device 148 executing computer readable instructions 154 and/or executing computer readable instructions associated with one or more application(s)/devices/components of the CNN model 156.

As illustrated in FIG. 1, the entity system 106 is connected to the storage and encryption system 108 and may be associated with a financial institution network. In this way, while only one entity system 106 is illustrated in FIG. 1, it is understood that multiple network systems may make up the system environment 100 and be connected to the network 101. The entity system 106 generally comprises a communication device 136, a processing device 138, and a memory device 140. The entity system 106 comprises computer-readable instructions 142 stored in the memory device 140, which in one embodiment includes the computer-readable instructions 142 of an institution application 144. The entity system 106 may communicate with the recognition and extraction system 108. The storage and encryption system 108 may communicate with the entity system 106 via a secure connection generated for secure encrypted communications between the two systems for communicating data for processing across various applications.

As further illustrated in FIG. 1, in some embodiments, the convolutional neural network model system environment 100 further comprises a third party system 105, in operative communication with the recognition and extraction system 108, the entity system 106, and/or the user device 104. Typically, the third party system 105 comprises a communication device, a processing device and memory device with computer readable instructions. In some instances, the third party system 105 comprises a first database/repository comprising software code or program component objects, and/or a second database/repository comprising functional source code associated with software or program component objects and attributes. These applications/databases may be operated by the processor executing the computer readable instructions associated with the third party system 105, as described previously. Although a single external third party system 105 is illustrated, it should be understood that, the third party system 105 may represent multiple technology servers operating in sequentially or in tandem to perform one or more data processing operations.

It is understood that the servers, systems, and devices described herein illustrate one embodiment of the invention. It is further understood that one or more of the servers, systems, and devices can be combined in other embodiments and still function in the same or similar way as the embodiments described herein.

FIG. 2a depicts a high level process flow for audio file collection and segmenting, in accordance with one embodiment of the present invention. As shown in FIG. 2a, an original audio file 204 may be recorded during a communication between user 102 and an agent 202 of the entity system 106. In some embodiments, the channel of communication between the user 102 and agent 202 may be a phone call, voice over IP session, virtual reality session, video call or the like. The audio file may be recorded in any number of suitable formats, including, but not limited to, an .mp3 file, mp4 file, .wav file, aac file, or the like. As further shown in FIG. 2a, a voice analysis engine 204 of the recognition and extraction system 108 may be employed to generated extracted user voice segment(s) 205 and extracted agent voice segment(s) 206. In this way, the system may analyze the original audio file and segment the file into multiple extracted parts that represent the voice of the user 102 and the agent 202, such that these separate files can be categorized and compiled in separate secure files later on. A more detailed process flow of the voice analysis engine 204 is shown in FIG. 3 and discussed further herein but covers various applications of pre-trained models which use reference voice segments of the user 102 and agent 202 in order to segment and identify wave transforms which correspond to unique qualities of each user. It is understood that the voice analysis engine 204 is primarily used as a tool to classify the agent and user voice portions of the recording and separate these into different segments, attaching an interaction timestamp in order to later reference portions of the call utilizing a hashing algorithm in order to maintain a sequence of audio recording segments.

FIG. 2b depicts a high level process flow for audio file encryption, decryption, and analysis, in accordance with one embodiment of the present invention. As shown in FIG. 2b, the process of FIG. 2a continues from process point "A" wherein the stego chao encrypter 208 receives the segmented audio files and applies a key file 210 in order to generate an encrypted audio file. The segmented audio files are encrypted using a dynamic image based on an assigned conversation ID and timestamp of each segment, and these data points are stored securely in an encrypted database of the recognition and extraction system 108 for later recognition during decryption. The resulting files are referred to as encrypted audio files 212.

If at any point the entity system 106 or an agent 202 thereof requires access to the encrypted audio file 212, an authentication request for access to encrypted audio 214 may be submitted to the recognition and extraction system 108 (e.g., using an existing authentication technique of the entity system, such as a username and password, three factor authentication, biometric authentication, or the like). A stego chao decrypter 216 may be applied using the reference data securely stored during the encryption process, wherein the key file may be used to decrypt the audio waveform of the audio segment. The stego chao decrypter 216 is used to convert the encrypted audio into original audio for analysis. The decrypted audio file may be further processed and analyzed by a cognitive voice processing engine 218 in order to provide relevant information back to the entity system 106. The cognitive voice processing engine 218 is used to primarily to evaluate client preferences and detect any agent anomaly during course of interactions between the user 102 and agent 202.

FIG. 3 depicts a process flow diagram voice analysis engine 204, in accordance with one embodiment of the present invention. A shown in FIG. 3, the process involves two pre-training processes. In the first of the pre-train processes, user reference audio 304, such as a collected sample of the user 102's voice is processed user encoder LSTM (long term short term memory) 302 network. Encoder LSTM 302 is developed for natural language processing problems where it demonstrated state-of-the-art performance, specifically in the area of statistical machine translation. In other words, it is a specific type of machine learning algorithm which can be used to read an input sequence and encode it into a fixed-length vector representing unique qualities of the user reference audio 304 which can be applied as a d-vector 306. The d-vector 306 represents the mean of the feature vectors in a final hidden layer. This becomes the model for the voice of the user 102, used to compare against other speech samples for identification purposes. The CNN model 156 may be utilized to execute a LSTM recurring neural network 310 process wherein a fully connected layer 312 generates a soft mask prediction 314. The soft mask prediction is compared back to an input spectrogram 320 generated from a Short-time Fourier transform (STFT) 318 (used to determine the sinusoidal frequency and phase content of local sections of a signal as it changes over time) of the call recording 316. The system generates a masked spectrogram 322, followed by an inverse STFT 324. Finally, as shown in block 334, the voice analysis engine produces enhanced extraction segments 334, which represent segmented portions of the call recording where either the user 102 or the agent 202 are speaking. Also noted in FIG. 3 is the pre-train process where clean audio of the agent 326 is processed using a STFT 328. In some embodiments, the entity system 106 may record agent audio during the call recording. This produces a clean spectrogram 330 which can be compared to the masked spectrogram 322 in order to generate a loss function 332 in order to automate a separation of agent 202 audio from the call recording.

FIG. 4 depicts process flow diagrams of stego chao encrypter 208 and stego chao decrypter 216, in accordance with one embodiment of the present invention. As shown in FIG. 4, the stego chao encrypter 208 comprises a process whereby the voice file 402 is processed using a 16 bit quantifier 404 to produce a visual wave transform before completing permutation 406 and diffusion 408 steps using image map 410. The image map 410 step randomly or pseudo randomly selects and logs a correct image key 418 for each audio segment. Via steganography, the stego chao encrypter 208 produces an obfuscated image of the wave transform in order to produce an encrypted voice file. Accompanying image key, timestamp, and user data (user identification, known preferences or the like) are logged in the datastore of the recognition and extraction system 108. The main operations in this sort of image encryption lies in two aspects: permutation, which changes the positions of pixels, as well as diffusion, that changes the pixels' values using the correct image key 418. In chaos-based image encryption (hence, the "chao" in stego chao encrypter), these two types of operations are determined by the generated chaotic sequences from chaotic systems. These operations can be conducted on block-levels of pixels, pixel-level, and bit-level data. As also shown in FIG. 4, the stego chao decrypter 216 may apply the image map 410 data using the correct image key 418 in order to perform an inverse diffusion 414 and inverse permutation 416. As noted in block 410, applying the wrong image key 420 will result in an invalid audio file 422 containing noise data that does not correspond to the voice file 402. In this way, the system's knowledge of the correct image key 418 via the image map 410 is crucial to decrypting the wave transform of the voice file 402 and recovering sensible data from the encrypted wave transforms which are stored as encrypted image files.

FIG. 5 depicts a process flow diagram of a cognitive voice processing engine, in accordance with one embodiment of the present invention. The cognitive voice processing engine analyzes audio content of decrypted audio files to determine contextual significance and content of the communication. As shown on the left of FIG. 5, the first step of the cognitive voice processing engine process includes classifying features for utterances (u1,u2 . . . ) which are extracted and fed to a bi-directional Gated Recurrent Unit (GRU) due to sequential nature of the conversation, which allows the engine to derive contextual information. In a second step, vertices of the graph represents utterance in the conversation, while edges represent the context to be modelled. Weights are set using a similarity-based attention module. The engine uses Graph Convolutional Neural Network (GCN) new feature (h1,h2 . . . ) by aggregating local neighbourhood information from past and future context window. Next, via a context encoder, feature vectors are concatenated, and a similarity-based attention mechanism is applied to obtain the final utterance representation. For each utterance, a response is captured and stored it in the database as a state transition. It is understood that a Markov transition is applied over the state transition to predict the next state (e.g., user 102 tendency to detract or not, or the like). Finally, a progressive scoring is applied over the state transition to check agent 104 efficiency and user 102 preferences As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A system for secure information storage analysis, the system comprising:
    at least one memory device with computer-readable program code stored thereon;
    at least one communication device;
    at least one processing device operatively coupled to the at least one memory device and the at least one communication device, wherein executing the computer-readable code is configured to cause the at least one processing device to:
        record an audio file of a call between one or more users;
        generate a wave transform of the audio file by processing the audio file via a 16 bit quantifier to produce the wave transformation in image file form;
        analyze the wave transform of the audio file to identify segments of the audio file which represent the voice of each of the one or more users;
        store timestamps, an image key, and user data corresponding to each of the identified segments of the audio file; and
        encrypt each of the identified segments of the audio file using a steganographic application of the image file, wherein the steganographic application of the image file further comprises using a steganographic chaos encryption function, wherein the steganographic chaos encryption permutates and diffuses positions of the pixels in the image file associated with the encrypted individual segments of the audio file.

2. The system of claim 1, further configured to:
    convert an encrypted audio file back to an original audio file; and
    apply a cognitive processing engine to extract one or more contextual inferences from the original audio file.

3. The system of claim 1, further configured to:
    receive a request for decryption of the identified segments of the audio file;
    respond to the request for decryption with a request for one or more authentication credentials;
    receive the one or more authentication credentials;
    determine if the one or more authentication credentials are valid; and
    based on the authentication credentials provided, respond to the request for decryption with an automated decryption and delivery of a limited number of the identified segments of the audio file.

4. The system of claim 1, wherein the image file is randomly or pseudo randomly chosen for each of the identified segments of the audio file.

5. The system of claim 1, wherein each of the identified segments of the audio file is linked using hashing key and timestamp based a time sequence.

6. The system of claim 2, wherein the one or more contextual inferences further comprise client preferences or conversational anomalies during the course of a customer service interaction.

7. A computer program product for secure information storage analysis with at least one non-transitory computer-readable medium having computer-readable program code portions embodied therein, the computer-readable program code portions comprising:
    an executable portion configured to record an audio file of a call between one or more users;
    an executable portion configured to generate a wave transform of the audio file by processing the audio file via a 16 bit quantifier to produce the wave transformation in image file form;
    an executable portion configured to analyze the wave transform of the audio file to identify segments of the audio file which represent the voice of each of the one or more users;
    an executable portion configured to store timestamps, an image key, and user data corresponding to each of the identified segments of the audio file; and
    an executable portion configured to encrypt each of the identified segments of the audio file using a steganographic application of the image file, wherein the steganographic application of the image file further comprises using a steganographic chaos encryption function, wherein the steganographic chaos encryption permutates and diffuses positions of the pixels in the image file associated with the encrypted individual segments of the audio file.

8. The computer program product of claim 7, further comprising:
    an executable portion configured to convert an encrypted audio file back to an original audio file; and
    an executable portion configured to apply a cognitive processing engine to extract one or more contextual inferences from the original audio file.

9. The computer program product of claim 7, further comprising:
    an executable portion configured to receive a request for decryption of the identified segments of the audio file;
    an executable portion configured to respond to the request for decryption with a request for one or more authentication credentials;
    an executable portion configured to receive the one or more authentication credentials;
    an executable portion configured to determine if the one or more authentication credentials are valid; and
    an executable portion configured to, based on the authentication credentials provided, respond to the request for decryption with an automated decryption and delivery of a limited number of the identified segments of the audio file.

10. The computer program product of claim 7, wherein the image file is randomly or pseudo randomly chosen for each of the identified segments of the audio file.

11. The computer program product of claim 7, wherein each of the identified segments of the audio file is linked using hashing key and timestamp based a time sequence.

12. The computer program product of claim 8, wherein the one or more contextual inferences further comprise client preferences or conversational anomalies during the course of a customer service interaction.

13. A computer implemented method for secure information storage analysis, said computer implemented method comprising:
    providing a computing system comprising a computer processing device and a non-transitory computer readable medium, where the computer readable medium comprises configured computer program instruction code, such that when said instruction code is operated by said computer processing device, said computer processing device performs the following operations:
        record an audio file of a call between one or more users;
        generate a wave transform of the audio file by processing the audio file via a 16 bit quantifier to produce the wave transformation in image file form;
        analyze the wave transform of the audio file to identify segments of the audio file which represent the voice of each of the one or more users;
        store timestamps, an image key, and user data corresponding to each of the identified segments of the audio file; and
        encrypt each of the identified segments of the audio file using a steganographic application of the image file, wherein the steganographic application of the image file further comprises using a steganographic chaos encryption function, wherein the steganographic chaos encryption permutates and diffuses positions of the pixels in the image file associated with the encrypted individual segments of the audio file.

14. The computer-implemented method of claim 13, further configured to:
    convert an encrypted audio file back to an original audio file; and
    apply a cognitive processing engine to extract one or more contextual inferences from the original audio file.

15. The computer-implemented method of claim 13, further configured to:
    receive a request for decryption of the identified segments of the audio file;
    respond to the request for decryption with a request for one or more authentication credentials;
    receive the one or more authentication credentials;
    determine if the one or more authentication credentials are valid; and
    based on the authentication credentials provided, response to the request for decryption with an automated decryption and delivery of a limited number of the identified segments of the audio file.

16. The computer-implemented method of claim 13, wherein the image file is randomly or pseudo randomly chosen for each of the identified segments of the audio file.

17. The computer-implemented method of claim 13, wherein each of the identified segments of the audio file is linked using hashing key and timestamp based a time sequence.

* * * * *